(12) United States Patent
Okane et al.

(10) Patent No.: US 9,114,468 B2
(45) Date of Patent: Aug. 25, 2015

(54) POWER SUPPLY DEVICE FOR ELECTRICAL DISCHARGE MACHINE

(75) Inventors: Masahiro Okane, Chiyoda-ku (JP); Satoshi Suzuki, Chiyoda-ku (JP); Kiyohito Oda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/359,367

(22) PCT Filed: Nov. 30, 2011

(86) PCT No.: PCT/JP2011/077724
§ 371 (c)(1),
(2), (4) Date: May 20, 2014

(87) PCT Pub. No.: WO2013/080347
PCT Pub. Date: Jun. 6, 2013

(65) Prior Publication Data
US 2014/0319102 A1    Oct. 30, 2014

(51) Int. Cl.
*B23H 1/02*    (2006.01)
*B23H 7/04*    (2006.01)
*B23H 7/02*    (2006.01)

(52) U.S. Cl.
CPC .............. *B23H 1/02* (2013.01); *B23H 1/022* (2013.01); *B23H 7/02* (2013.01); *B23H 2300/20* (2013.01)

(58) Field of Classification Search
CPC ...... B23H 1/022; B23H 1/04; B23H 2300/20; B23H 7/04; B23H 7/14; B23H 1/02; B23H 7/02

USPC .............................................. 219/69.13, 69.18
See application file for complete search history.

(56) References Cited

U.S. PATENT DOCUMENTS

| | | | | |
|---|---|---|---|---|
| 3,409,753 A | * | 11/1968 | Inoue ......................... | 219/69.13 |
| 3,851,135 A | * | 11/1974 | Moracz et al. .............. | 219/69.17 |
| 3,974,357 A | * | 8/1976 | Saito et al. .................. | 219/69.13 |
| 4,319,114 A | * | 3/1982 | Bell et al. ................... | 219/69.13 |
| 4,655,888 A | * | 4/1987 | Kilcher et al. .............. | 219/69.13 |
| 4,967,054 A | * | 10/1990 | Obara et al. ................ | 219/69.13 |
| 5,374,798 A | | 12/1994 | Kinbara | |

(Continued)

FOREIGN PATENT DOCUMENTS

| | | |
|---|---|---|
| DE | 3419943 a1 | 11/1985 |
| JP | 01-216721 A | 8/1989 |

(Continued)

OTHER PUBLICATIONS

Machine translation of Japan Patent No. 2010-155,330, Jan. 2015.*

(Continued)

*Primary Examiner* — Geoffrey S Evans
(74) *Attorney, Agent, or Firm* — Sughrue Mion, PLLC; Richard C. Turner

(57) ABSTRACT

The present invention includes a series circuit that includes a DC power supply and a switching element for supplying a DC or AC current pulse to a machining gap between a machining electrode and a workpiece; and a control unit that controls the switching element, wherein when generating a current pulse having a triangular shape by an inductance present on the series circuit, the control unit controls on-time and off-time of the switching element such that a peak value of an arbitrary current pulse in a pulse train including a plurality of current pulses changes.

7 Claims, 11 Drawing Sheets

(56) References Cited

U.S. PATENT DOCUMENTS

| | | | |
|---|---|---|---|
| 5,872,347 A * | 2/1999 | Li et al. | 219/69.13 |
| 5,897,792 A * | 4/1999 | Kaneko et al. | 219/69.18 |
| 7,645,958 B2 * | 1/2010 | Oda et al. | 219/69.13 |
| 7,816,619 B2 * | 10/2010 | Jaksic | 219/69.17 |
| 2003/0222052 A1 * | 12/2003 | Martin et al. | 219/69.13 |
| 2006/0054600 A1 * | 3/2006 | Satou et al. | 219/69.18 |
| 2007/0289949 A1 * | 12/2007 | Suzuki et al. | 219/69.13 |
| 2008/0017614 A1 | 1/2008 | Oda et al. | |
| 2008/0190897 A1 * | 8/2008 | Buhler et al. | 219/69.17 |
| 2011/0220615 A1 | 9/2011 | Yamada et al. | |
| 2012/0228268 A1 * | 9/2012 | Morita et al. | 219/69.11 |
| 2013/0292360 A1 * | 11/2013 | Okane et al. | 219/69.13 |

FOREIGN PATENT DOCUMENTS

| | | |
|---|---|---|
| JP | 03-055117 A | 3/1991 |
| JP | 05-208316 A | 8/1993 |
| JP | 05-085520 U | 11/1993 |
| JP | 11-070412 A | 3/1999 |
| JP | 2914123 B2 | 6/1999 |
| JP | 2003-181724 A | 7/2003 |
| JP | 2010-155330 A * | 7/2010 |
| JP | 2010-155330 A | 7/2010 |
| JP | 2010-201521 A | 9/2010 |
| JP | 4850317 B1 | 1/2012 |
| WO | 01/32342 A1 | 5/2001 |
| WO | 2006/046599 A1 | 5/2006 |

OTHER PUBLICATIONS

Notice of Rejection, 2012-524977, dated Aug. 21, 2012.
Communication dated Aug. 19, 2014, issued by the German Patent Office in counterpart Application No. 112011105900.0.

* cited by examiner

POWER SUPPLY DEVICE FOR ELECTRICAL DISCHARGE MACHINE

CROSS REFERENCE TO RELATED APPLICATIONS

This application is a National Stage of International Application No. PCT/JP2011/077724 filed Nov. 30, 2011, the contents of all of which are incorporated herein by reference in their entirety.

FIELD

The present invention relates to a power supply device for an electrical discharge machine.

BACKGROUND

Prior art documents related to conventional power supply devices for electrical discharge machines include Patent Literatures 1 and 2 described below.

In the power supply device for an electrical discharge machine described in Patent Literature 1, a technology is disclosed in which switching elements, which intermittently generate a pulse train having a predetermined repetition frequency every predetermined time, are driven and an AC pulse current is supplied to the machining gap between the machining electrode and a workpiece, with a capacitor connected in parallel, thereby preventing a follow current of an arc current by completely discharging the charge in the capacitor to the machining gap and thus improving the surface roughness in the electrical discharge machining.

Moreover, in the power supply device for an electrical discharge machine described in Patent Literature 2, a technology is disclosed in which, in the configuration that includes a DC power supply for supplying a DC pulse current to the machining gap between the machining electrode and a workpiece, a series circuit composed of a switching element and a resistor, a capacitor that is connected in parallel with the machining electrode and the workpiece, and a discharge detecting unit that detects the occurrence of a discharge in the machining gap, an on/off control to turn on the switching element for a pulse width that is equal to or less than the pulse width of a discharge current of the capacitor and to turn off the switching element for a predetermined time is repeated until the capacitor discharges and the discharge detecting unit detects the discharge and the on/off control is repeated again after a predetermined off-time after detection of the discharge by the discharge detecting unit. According to the power supply device for an electrical discharge machine described in Patent Literature 2, a follow current of an arc current is prevented in a similar manner to Patent Literature 1 by preventing a current having a pulse width equal to or larger than the pulse width of the discharge of the capacitor from flowing in the gap (hereinafter, referred to as "machining gap") between the machining electrode and a workpiece (see FIG. 2 and FIG. 11).

CITATION LIST

Patent Literature

Patent Literature 1: Japanese Patent Application Laid-open No. H03-55117
Patent Literature 2: Japanese Patent: No. 2914123

SUMMARY

Technical Problem

The power supply devices for electrical discharge machines described in Patent Literatures 1 and 2 described above are configured such that a resistor is indispensable between the DC power supply and the machining electrode; therefore, when the machining current is large, the amount of heat generated in the resistor increases and thus the amount of heat generated in the device increases.

Moreover, the power supply device for an electrical discharge machine described in Patent Literature 2 described above uses a method of preventing a follow current of an arc current by limiting the pulse width of the current flowing in the machining gap to as short a time as possible; therefore, there is current-less time of equal to or longer than a given period of time, during which a discharge current does not flow in the machining gap, and thus the machining speed cannot be increased significantly.

The present invention has been achieved in view of the above and an object of the present invention is to provide a power supply device for an electrical discharge machine capable of increasing the machining speed and suppressing an increase in the amount of heat generated compared with the conventional devices.

Solution to Problem

In order to solve the above problems and achieve the object, a power supply device for an electric discharge machine according to the present invention includes a series circuit that includes a DC power supply and a switching element for supplying a DC or AC current pulse to a machining gap between a machining electrode and a workpiece; and a control unit that controls the switching element, wherein when generating a current pulse having a triangular shape by an inductance component present on the series circuit, the control unit controls the switching element such that a current pulse time ratio, which is a ratio between a current-less time and a current duration in the current pulse, becomes equal to or less than ⅕.

Advantageous Effects of Invention

According to the present invention, an effect is obtained where the machining speed can be increased and an increase in the amount of heat generated can be suppressed compared with the conventional devices.

DESCRIPTION OF EMBODIMENTS

A power supply device for an electrical discharge machine according to embodiments of the present invention will be explained below with reference to the accompanying drawings. The present invention is not limited to the embodiments described below.

First Embodiment

Figure 1:
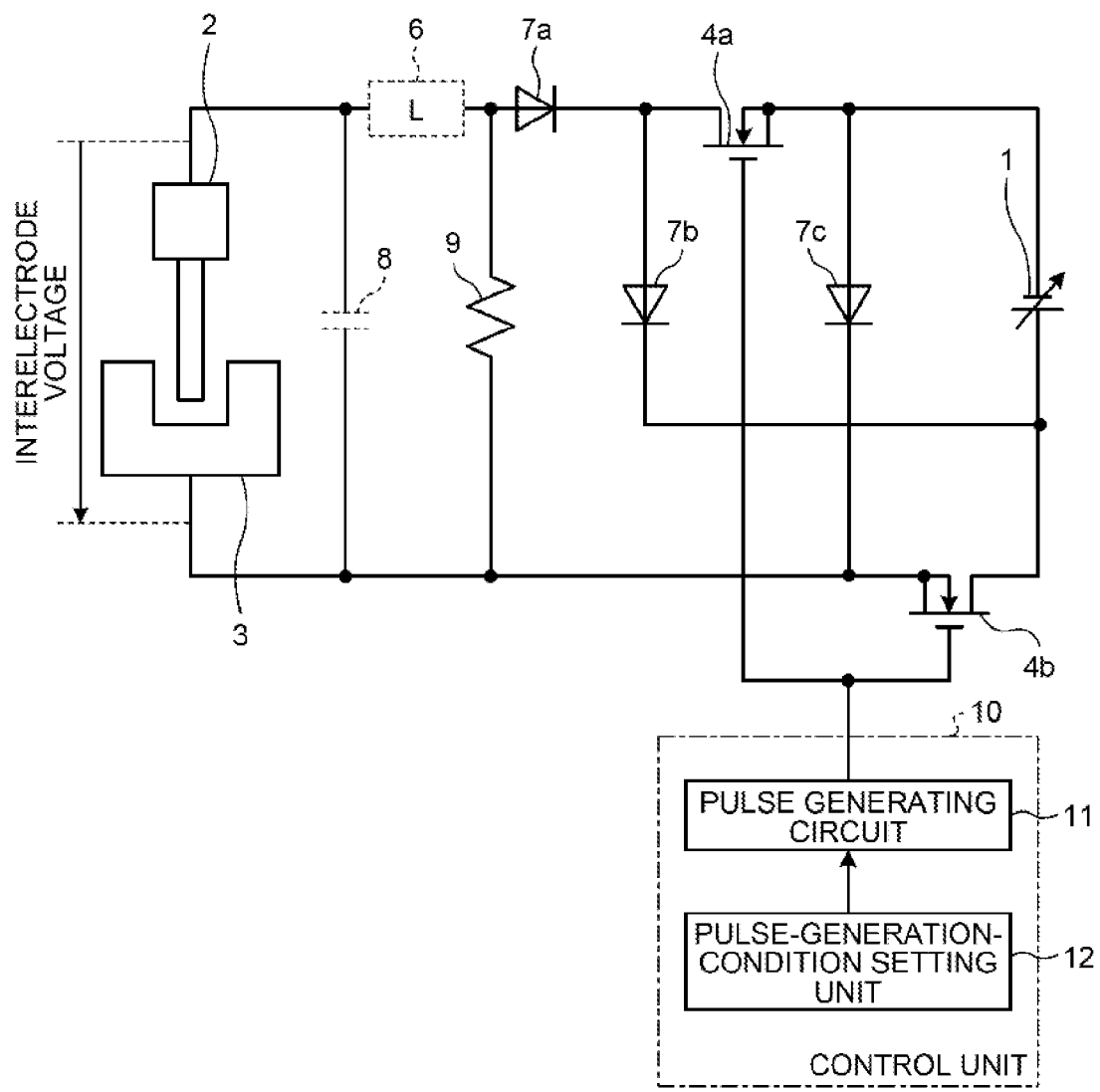
FIG. 1 is a diagram illustrating one configuration example of an electrical discharge machine that includes a power supply device for an electrical discharge machine according to a first embodiment.

FIG. 1 is a diagram illustrating one configuration example of an electrical discharge machine that includes a power supply device for an electrical discharge machine according to a first embodiment. The power supply device for an electrical discharge machine according to the first embodiment includes a DC power supply 1, switching elements 4a and 4b, diodes 7a to 7c, a resistor 9, and a control unit 10.

In FIG. 1, a workpiece 3 and a machining electrode 2 (a shaped electrode in the case of a small hole electrical discharge machine and a die sinking electrical discharge machine, and a wire in the case of a wire electrical discharge machine) are connected to the DC power supply 1 via the switching elements 4a and 4b (in this embodiment, FETs are exemplified), the diode 7a, and an inductance 6. The source end of the switching element 4a is connected to the negative electrode of the DC power supply 1 and the drain end of the switching element 4a is connected to the cathode end of the diode 7a. The source end of the switching element 4b is connected to the workpiece 3 and the drain end of the switching element 4b is connected to the positive electrode of the DC power supply 1. The inductance 6 is a parasitic inductance component present on the current path and is indicated by the dashed line in FIG. 1 as a component that is generated between the anode end of the diode 7a and the machining electrode 2. The diode 7a is not an indispensable component and can be omitted.

The diodes 7b and 7c are elements that restrict the direction in which a current flows to one direction together with the diode 7a. The anode end of the diode 7b is connected to the connection end of the switching element 4a and the diode 7a and the cathode end of the diode 7b is connected to the positive electrode of the DC power supply 1. Moreover, the cathode end of the diode 7c is connected to the connection end of the switching element 4b and the workpiece 3 and the anode end of the diode 7c is connected to the connection end of the negative electrode of the DC power supply 1 and the switching element 4a.

There are a stray capacitance component determined in accordance with the size and shape of the workpiece 3 and the machining electrode 2, the distance (interelectrode distance) between the workpiece 3 and the machining electrode 2, and the like and a capacitance component in the wire between the workpiece 3 and the machining electrode 2. Therefore, as indicated by the dashed line portion in FIG. 1, these capacitance components are illustrated as a stray capacitance 8 that is connected across both ends of the workpiece 3 and the machining electrode 2.

On the other hand, the control unit 10 is a component that performs an on/off control on the switching elements 4a and 4b and is configured to include a pulse generating circuit 11 and a pulse-generation-condition setting unit 12. The pulse-generation-condition setting unit 12 sets the machining conditions input from the outside and various conditions (for example, machining time, machining current, timing at which the switching elements 4a and 4b are turned on, on/off time ratio of the switching elements 4a and 4b (ratio of off-time to on-time:off-time/on-time), and the like) set on the basis of the machining conditions. The pulse generating circuit 11 controls the switching elements 4a and 4b by generating a control signal for turning on/off the switching elements 4a and 4b on the basis of a signal from the pulse-generation-condition setting unit 12.

Figure 2:
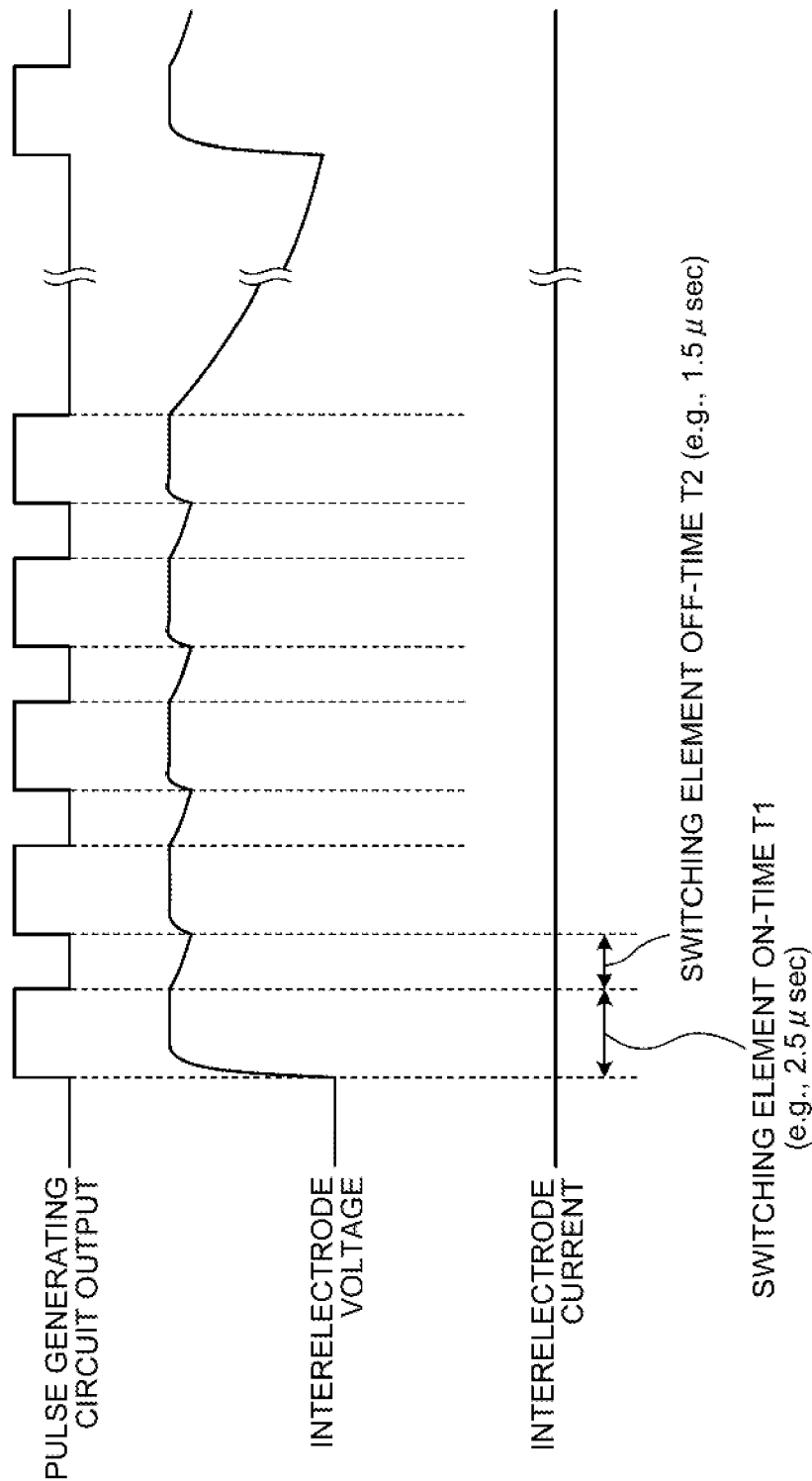
FIG. 2 is a diagram illustrating the interelectrode voltage and the interelectrode current when the electrodes are open in the electrical discharge machine according to the first embodiment.
Figure 3:
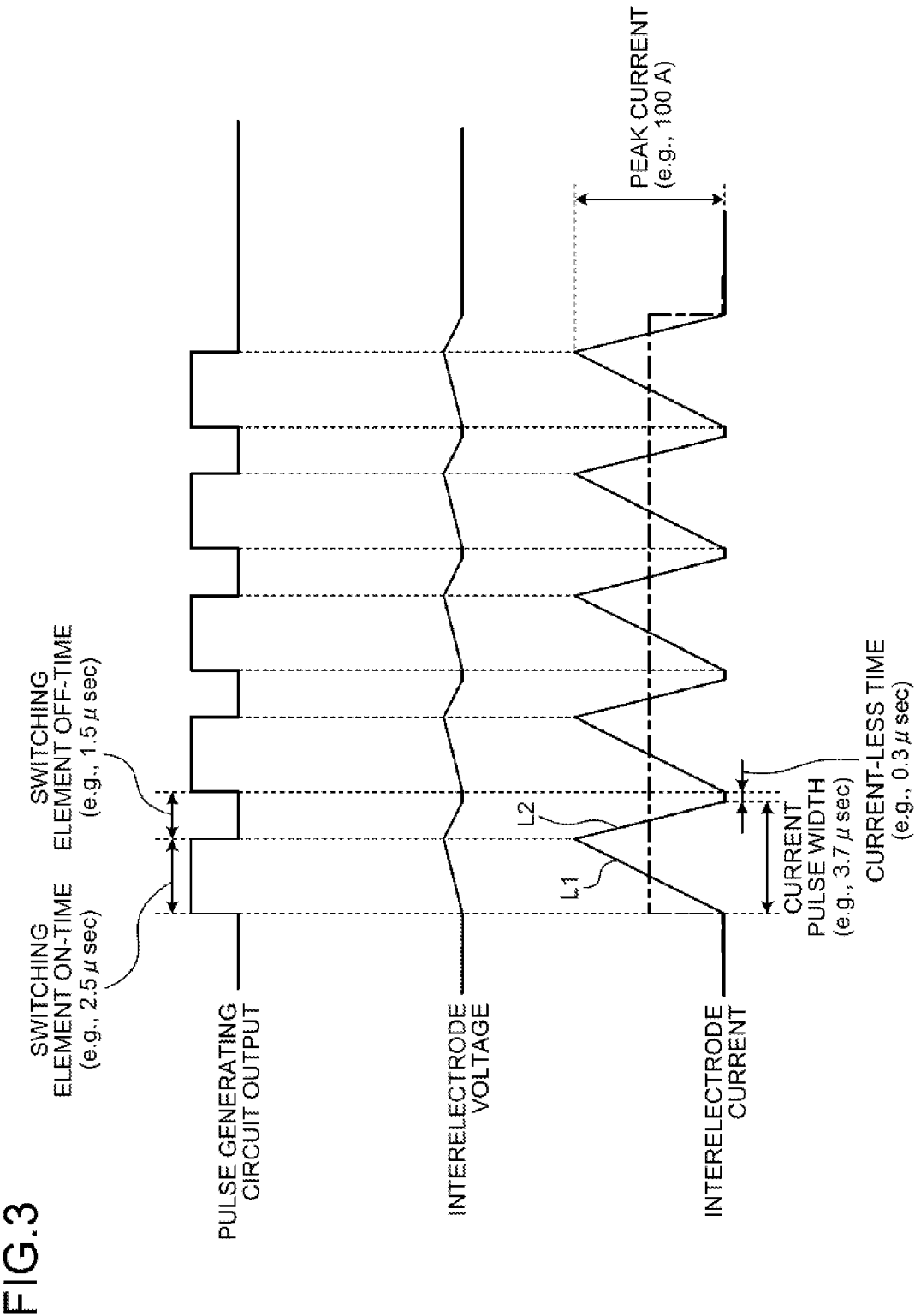
FIG. 3 is a diagram illustrating the interelectrode voltage and the interelectrode current when a discharge occurs in the electrical discharge machine according to the first embodiment.
Figure 4:
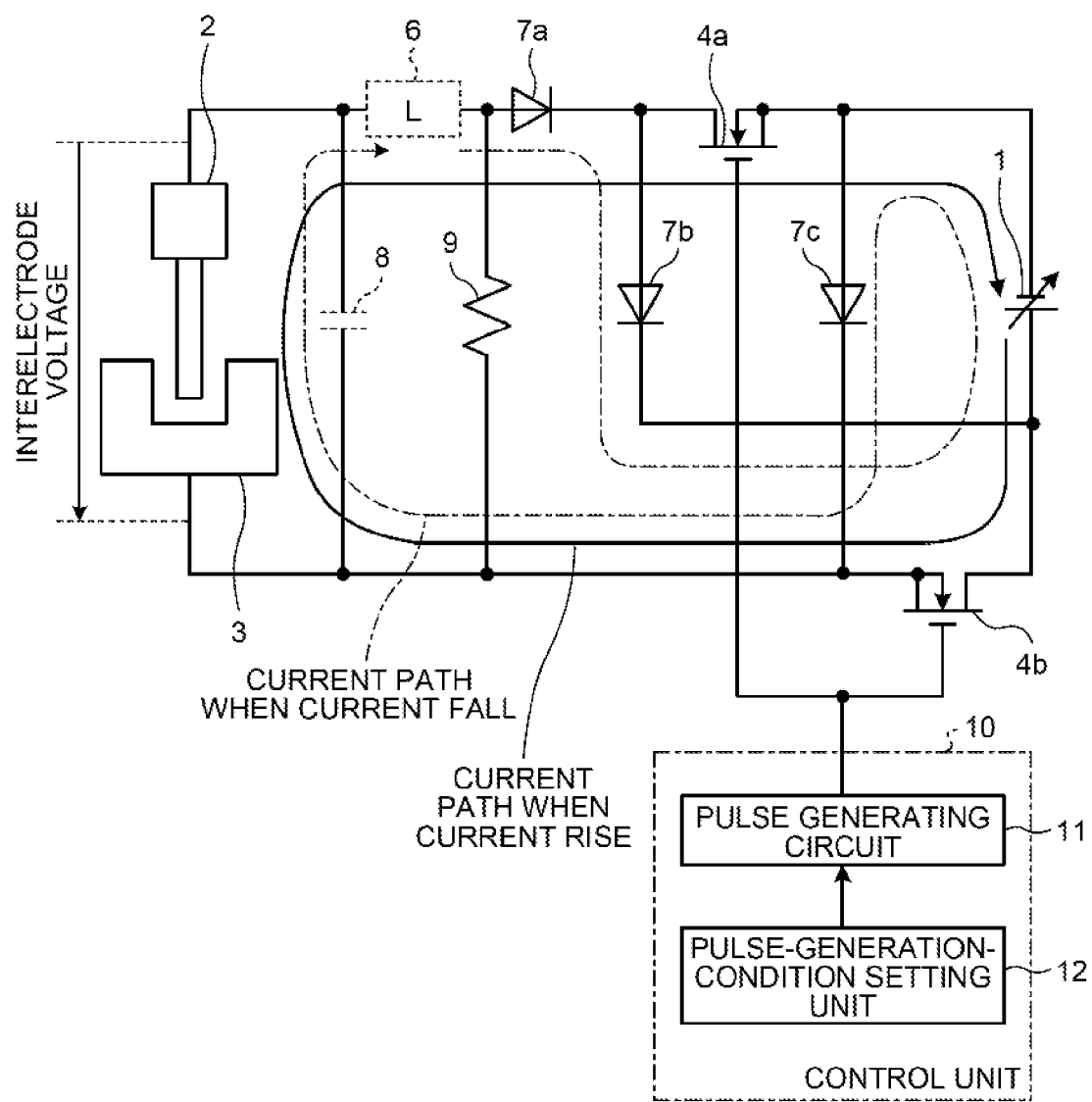
FIG. 4 is a diagram of the paths of a current flowing in the electrical discharge machine illustrated on the circuit configuration in FIG. 1.

Next, the operations of the power supply device for an electrical discharge machine according to the first embodiment will be explained with reference to each of the drawings of FIG. 1 to FIG. 4. FIG. 2 is a diagram illustrating the interelectrode voltage and the interelectrode current when the electrodes are open, i.e., when the interelectrode current does not flow, FIG. 3 is a diagram illustrating the interelectrode voltage and the interelectrode current when a discharge occurs, i.e., when the interelectrode current is flowing, and FIG. 4 is a diagram of the paths of a current flowing in the electrical discharge machine illustrated on the circuit configuration in FIG. 1.

In the power supply device for an electrical discharge machine in the first embodiment, the pulse generating circuit 11 of the control unit 10 outputs a predetermined number of pulse trains (in FIG. 2, five pulse trains are exemplified) each of which is on for a predetermined time T1 and is off for a predetermined time T2 as illustrated in the upper stage in FIG. 2. As illustrated in FIG. 2, a predetermined pause time is provided between the respective pulse trains. The switching elements 4a and 4b are controlled such that they are turned on and off simultaneously by these pulse trains and apply the DC voltage of the DC power supply 1 to the machining gap between the workpiece 3 and the machining electrode 2.

When the interelectrode current does not flow (i.e., when a discharge does not occur), the DC voltage from the DC power supply 1 is applied to the stray capacitance 8 due to the pulse trains being turned on and the stray capacitance 8 is charged. At this point, as illustrated in the middle stage in FIG. 2, the interelectrode voltage (charging voltage) is held during the period in which the pulse train is on, and part of the accumulated charge is discharged in accordance with the time constant substantially determined by the stray capacitance 8 and the resistor 9 during the period in which the pulse train is off. The intermittently applied pulse trains cause the charging and discharging to be repeated. During the pause period after the pulse train application, the accumulated charge in the stray capacitance 8 is discharged and the interelectrode voltage decreases toward the zero level in accordance with the time constant.

On the other hand, when the interelectrode current flows (i.e., when a discharge occurs), the accumulated charge (charging energy) of the stray capacitance 8 is supplied to the machining gap. The paths (current paths) of the interelectrode current are as illustrated in FIG. 4. More specifically, the current rises at the timing at which the pulse train is turned on, and the interelectrode current flows through the current path indicated by the solid line, i.e., from the positive electrode of the DC power supply 1→the switching element 4b→the workpiece 3→the machining electrode 2→the inductance 6→the diode 7a→the switching element 4a→the negative electrode of the DC power supply 1. In contrast, the current falls at the timing at which the pulse train is turned off, and the interelectrode current flows through the current path indicated by the chain line, i.e., from the inductance 6→the diode 7a→the diode 7b→the positive electrode of the DC power supply 1→the negative electrode of the DC power supply 1→the diode 7c→the workpiece 3→the machining electrode 2→the inductance 6 by the energy accumulated in the inductance 6.

As described above, the interelectrode current as illustrated in the lower stage in FIG. 3 flows. The accumulated charge in the stray capacitance 8 is supplied to the machining gap during a discharge and a change of the interelectrode voltage is small as illustrated in the middle stage in FIG. 3.

Next, the operations of the main portions of the power supply device for an electrical discharge machine according to the first embodiment will be explained with reference to the drawings of FIG. 3 and FIG. 4 and the like.

For example, the waveform illustrated in the lower stage in FIG. 3 is the interelectrode current (discharge current) waveform when the on-time of the switching elements 4a and 4b is set to 2.5 μsec and the off-time of the switching elements 4a and 4b is set to 1.5 μsec, i.e., the on/off time ratio is set to 1.5/2.5=0.6. The positive tilt portion L1 of the interelectrode current waveform is a current component that rises transiently in accordance with the time constant determined by the inductance component of the inductance 6 and the resistance components (such as the resistance of the electrical discharge machine including the resistance of the machining gap and machining fluid, the wiring resistance, and the on-resistance components of the switching elements 4a and 4b and the diode 7a) that are present on the current path when the switching elements 4a and 4b are turned on. The positive tilt portion L1 rises approximately linearly as illustrated in FIG. 3. The negative tilt portion L2 of the interelectrode current waveform is a current component that falls in accordance with the time constant determined by the inductance component of the inductance 6 and the resistance components (such as the resistance of the electrical discharge machine including the resistance of the machining gap and machining fluid, the wiring resistance, the on-resistance components of the diodes 7a to 7c, and the internal resistance of the DC power supply 1) that are present on the current path when the switching elements 4a and 4b are turned off. The negative tilt portion L2 falls approximately linearly as illustrated in FIG. 3.

As is understood from the above description, if the circuit configuration is determined and the elements are selected, the tilt of the positive tilt portion L1 in the interelectrode current waveform when the switching elements 4a and 4b are switched from off to on is determined and the tilt of the negative tilt portion L2 in the interelectrode current waveform when the switching elements 4a and 4b are switched from on to off is also determined.

In the example in FIG. 3, it is found that the time during which the interelectrode current does not flow (current-less time) becomes 0.3 μsec and the time during which the interelectrode current continues to flow (current pulse width or current duration) becomes 3.7 μsec by setting the on-time of the switching elements 4a and 4b to 2.5 μsec and setting the off-time of the switching elements 4a and 4b to 1.5 μsec and, therefore, the ratio between the current-less time and the current pulse width (or current duration) is set to 0.3/3.7≈0.08.

Figure 5:
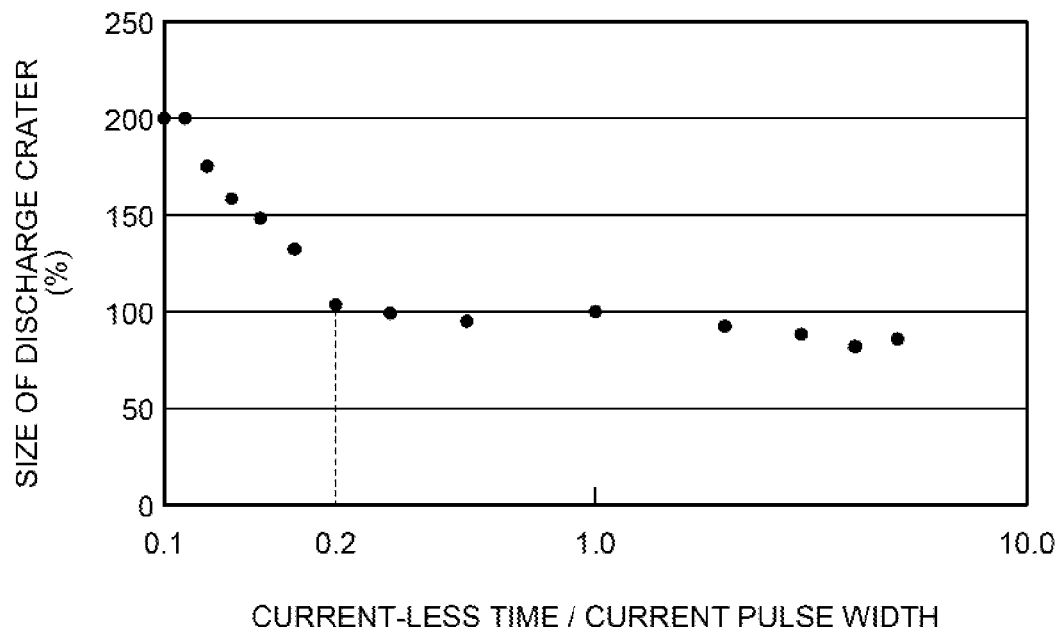
FIG. 5 is a diagram illustrating an example of a measurement result indicating the relationship between the current pulse time ratio and the size of a discharge crater.

FIG. 5 is a diagram illustrating an example of a measurement result indicating the size of a discharge crater when the on/off time ratio of the switching elements 4a and 4b is changed and machining is performed. In FIG. 5, the horizontal axis indicates the ratio between the current-less time and the current pulse width (hereinafter, referred to as "current pulse time ratio") and the vertical axis indicates the size of a discharge crater generated by machining. With regard to the size of a discharge crater, for example, in a small hole electrical discharge machining apparatus, the diameter of a hole when machining is performed under certain conditions with the current pulse time ratio being set to one is defined as one and the size of a discharge crater with respect to the current pulse time ratio is represented as a percentage.

From FIG. 5, at least the following four points can be understood.

(1) A discharge crater becomes larger as the current pulse time ratio becomes smaller.

(2) The size of a discharge crater exhibits a flat characteristic until the current pulse time ratio becomes equal to 0.2 and a discharge crater becomes larger when the current pulse time ratio becomes equal to or smaller than 0.2.

(3) The size of a discharge crater when the current pulse time ratio is equal to 0.1 is approximately twice the size of a discharge crater when the current pulse time ratio is equal to 1.0.

(4) Although there is no measured data when the current pulse time ratio is smaller than 0.1, the size of a discharge crater tends to hit a peak when the current pulse time ratio is around 0.1.

The current pulse time ratio being small means that the degree of concentration of the current energy is high. Therefore, when machining is performed with current pulses having a small current pulse time ratio, the machining speed increases compared with a case where machining is performed with current pulses having a large current pulse time ratio. Accordingly, it can be said that the current pulse time ratio=0.2 (=⅕) or a value close thereto is a preferable setting value that enables the machining speed to be increased while maintaining the machining accuracy.

The current pulse time ratio=0.1 (=1/10) is a setting value when machining is performed with importance placed on the machining speed rather than the machining accuracy. In the case of this setting value, as described above, the size of a discharge crater becomes approximately twice that in the case where the current pulse time ratio is equal to 1.0; however, when a small hole electrical discharge machining apparatus is used, a decrease in machining accuracy can be compensated for by reducing the diameter of the machining electrode 2. Accordingly, if the current pulse time ratio is set equal to or less than 0.1 (=1/10), an effect is obtained where the machining speed is further increased while maintaining the machining accuracy at or above a certain level.

Moreover, as a comparison with the above two cases, if the current pulse time ratio is set equal to or more than 0.1 (=1/10) and equal to or less than 0.2 (=1/5), an effect is obtained where both the machining speed and machining accuracy are improved.

Moreover, it is possible to perform machining in which the current-less time is reduced by setting the current pulse time ratio, preferably, equal to or less than 1/5 and, more preferably, equal to or less than 1/10. Accordingly, when a pulse train is viewed as a whole, it is equivalent to performing machining by applying a pseudo rectangular pulse (rectangular pulse of 20 µsec in the example in FIG. 3) in which the whole pulse train is regarded as one pulse as indicated by the chain line in FIG. 3. Therefore, an effect is obtained where the energy density in one discharge machining can be increased.

Figure 6:
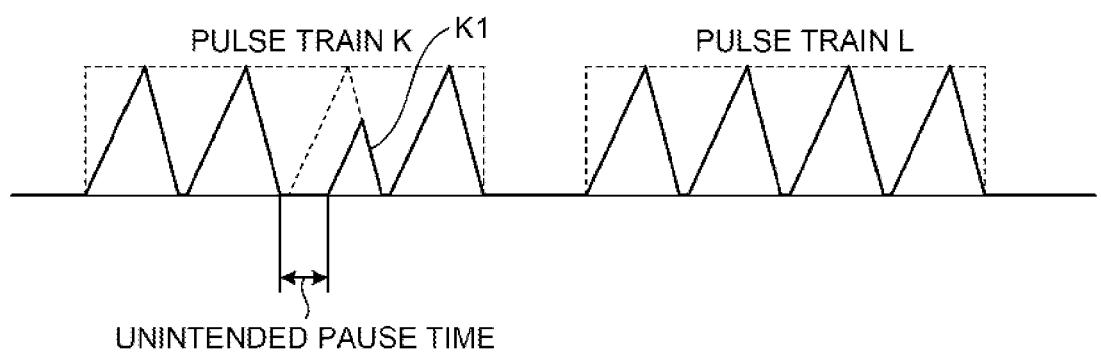
FIG. 6 is a diagram illustrating a waveform example when the time ratio of part of the pulses in a current pulse train does not become equal to or less than ⅕.

Even when the current pulse time ratio is set to 1/5 or a value close thereto, not all the current pulse time ratios in a pulse train may become equal to or less than 1/5 due to the delay of the discharge timing depending on the interelectrode state. FIG. 6 illustrates a waveform example when the time ratio of part of the current pulses does not become equal to or less than 1/5. More specifically, FIG. 6 illustrates an example where the rising edge of a third pulse K1 in a pulse train K is delayed and unintended pause time is generated.

It is believed that a current pulse train is interrupted and the width of the pulse train becomes shorter than intended as illustrated in FIG. 6 (in the example in FIG. 6, the pulse train K appears to be separated into a pulse train composed of a first pulse and a second pulse and a pulse train composed of the third pulse (K1) and a fourth pulse) at a certain rate depending on the interelectrode state or the setting state of the electrode feed control. However, such a phenomenon occurs in some cases even in the conventional power circuits that output a rectangular waveform (for example, Patent Literature 3: Japanese Patent Application Laid-open No. H07-237039), and such a phenomenon occurs infrequently and is therefore substantially negligible as a whole.

Moreover, in the case of the power supply device for an electrical discharge machine in the present embodiment, the configuration is such that there is no resistor between the DC power supply 1 and the machining electrode 2 and the interelectrode current that flows to the machining gap is limited by the inductance 6 present on the series circuit that includes the DC power supply 1 and the switching elements 4a and 4b; therefore, an effect is obtained where the amount of heat generated can be reduced compared with a case where a rectangular wave current having the same peak value flows.

FIG. 3 illustrates a case where the magnitude of the peak current is 100 A as an example; however, the peak current is not limited thereto and the magnitude of the peak current can be set in the range of, for example, 15 to 150 A. When the peak current is increased, a difficult-to-cut material, such as cemented carbide, can be machined, and, when the peak current is reduced, the machining accuracy can be improved.

Moreover, FIG. 3 illustrates a case where the current pulse width is 3.7 µsec as an example; however, the current pulse width is not limited thereto and the current pulse width can be set in the range of, for example, 0.3 to 10.0 µsec. When the current pulse width is increased, the substantial peak current can be increased; therefore, a difficult-to-cut material, such as cemented carbide, can be machined. When the current pulse width is reduced, the substantial peak current can be reduced; therefore, the machining accuracy and the surface roughness can be improved.

Moreover, the current pulse width and the magnitude of the peak current can be set individually. For example, when the peak current is 15 A, the current pulse width may be set to 0.3 µsec or may be set to 10.0 µsec. Moreover, for example, when the peak current is 150 A, the current pulse width may be set to 0.3 µsec or may be set to 10.0 µsec. Although the inductance is fixed, the current pulse width and the magnitude of the peak current can be changed individually. This is because the DC power supply 1 is a voltage variable power supply as illustrated in FIG. 1. In other words, by changing the voltage of the DC power supply 1, it is possible to change the current pulse width and the peak current individually such that a preferable current pulse width and a preferable peak current magnitude in accordance with the machining speed or machining accuracy are obtained.

As explained above, according to the power supply device for an electrical discharge machine in the first embodiment, the current pulses having a triangular wave shape are generated by using the inductance component that is present on the series circuit that includes the DC power supply and the switching elements and the switching elements are controlled such that the current pulse time ratio, which is the ratio between the current-less time and the current duration, in the current pulse becomes equal to or less than 1/5 and equal to or more than 1/10; therefore, both the machining speed and machining accuracy can be improved while suppressing the amount of heat generated.

The current pulse time ratio described above may be set to 1/5 or a value close thereto, whereby the machining speed can be increased while maintaining the machining accuracy.

The current pulse time ratio described above may be set to 1/10 or less, whereby the machining speed can be further increased while maintaining the machining accuracy at or above a certain level.

Second Embodiment

In the first embodiment, the pulse width of each current pulse in a current pulse train is controlled so as to be constant or approximately constant (in the example in FIG. 3, 3.7 µs) by fixing the switching element on-time and the switching element off-time in the pulse train (for example, in the example in FIG. 3, switching element on-time=2.5 µs and switching element off-time=1.5 µs). In contrast, the second embodiment illustrates an embodiment in which the pulse widths or the peak values of respective current pulses in a current pulse train are made different in the current pulse train.

Figure 7:
FIG. 7 is a diagram illustrating a waveform example of current pulse trains according to a second embodiment.

For example, in the case of a die sinking electrical discharge machine, the waveform whose current rising rate is low is suitable in order to suppress electrode consumption due to machining and one example thereof is illustrated in FIG. 7. The pulse trains in FIG. 7 are such that the peak value of a current pulse gradually increases from the first pulse to the third pulse. With such a pulse train, the current characteristics when viewed over the whole pulse train can be regarded as the current characteristics in which the rising rate is low as indicated by the dashed line in FIG. 7 (envelope connecting the peak values); therefore, this pulse train is effective for suppressing electrode consumption. For example, in the case of the example in FIG. 7, such a pulse train can be obtained by performing a control to gradually increase the switching element on-time and off-time from the first pulse to the third pulse (this is not limited to the third pulse and may be other pulses (including the last pulse)).

Figure 8:
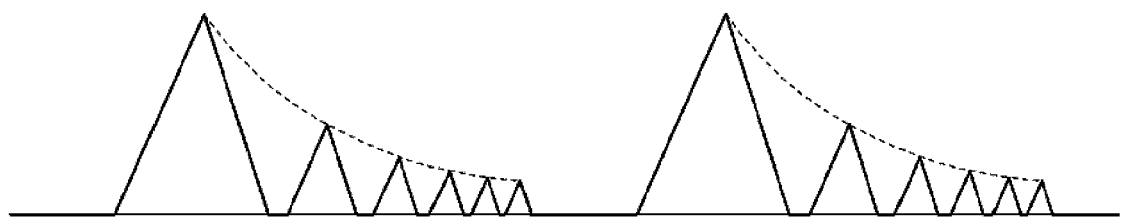
FIG. 8 is a diagram illustrating a waveform example of current pulse trains according to the second embodiment different from those in FIG. 7.

Moreover, in a die sinking electrical discharge machine, when a difficult-to-cut material, such as cemented carbide, is machined, it is possible in some cases to increase the machining speed and reduce electrode consumption by continuously causing a small current to flow for a while following a large triangular-wave current and an example thereof is illustrated in FIG. 8. The pulse trains in FIG. 8 are such that the peak values of the second and subsequent pulses following the first pulse having a relatively large peak value are relatively small and are gradually reduced. Such a pulse train is effective for suppressing electrode consumption while increasing the machining speed or without sacrificing the machining speed.

The pulse trains illustrated in FIG. 7 and FIG. 8 are examples and a desired pulse width and a desired peak value can be set by controlling the switching element on-time and switching element off-time.

As described above, according to the power supply device for an electrical discharge machine in the second embodiment, the peak values between the respective current pulses are made different by changing the peak value of a given or predetermined current pulse in a pulse train; therefore, electrode consumption can be suppressed while maintaining the effect of the first embodiment.

Third Embodiment

Figure 9:
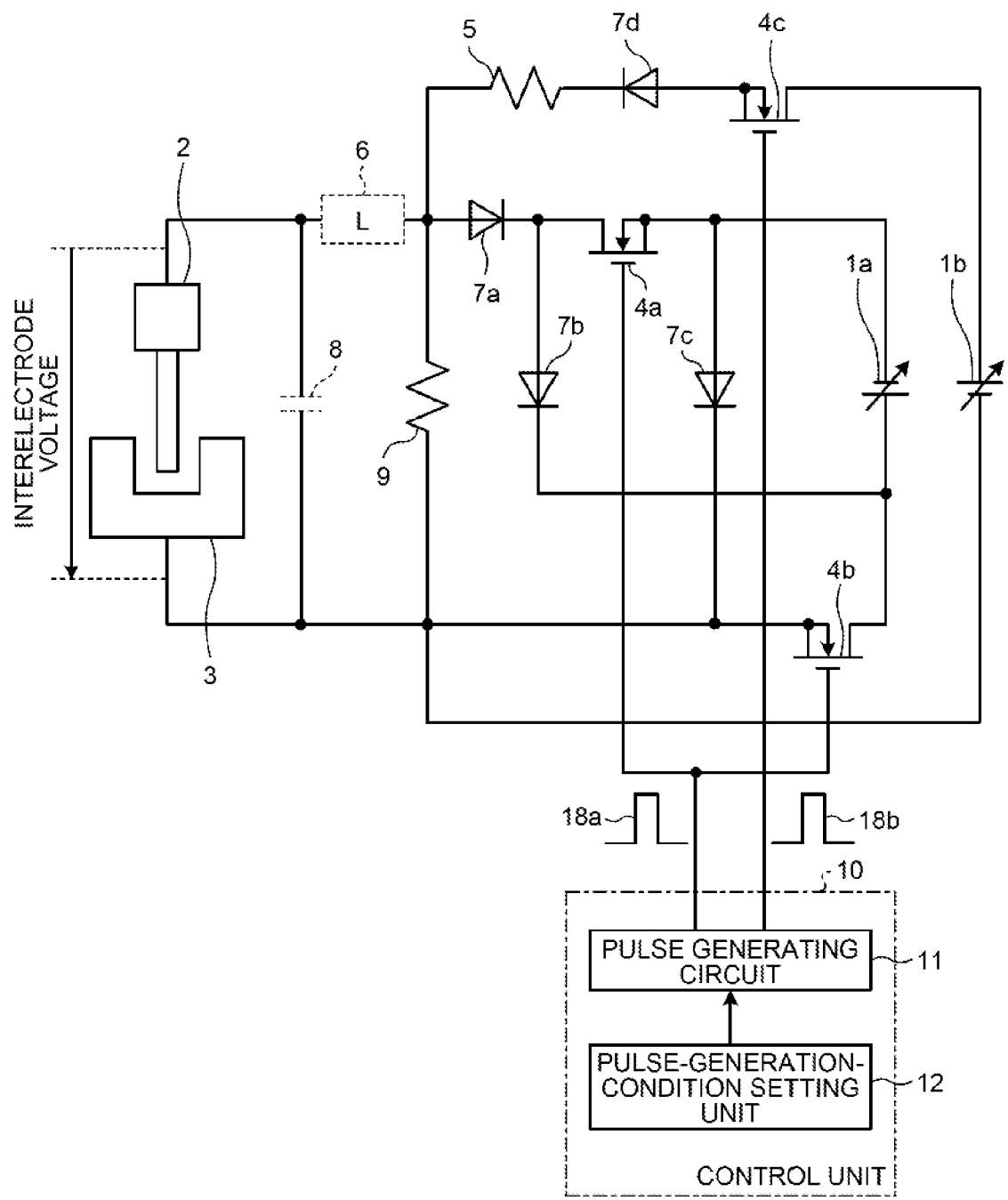
FIG. 9 is a diagram illustrating one configuration example of an electrical discharge machine that includes a power supply device for an electrical discharge machine according to a third embodiment.

FIG. 9 is a diagram illustrating one configuration example of an electrical discharge machine that includes a power supply device for an electrical discharge machine according to a third embodiment. While the power supply device for an electrical discharge machine in the first embodiment illustrated in FIG. 1 is a power supply device for an electrical discharge machine that can generate only positive-polarity current pulses, the power supply device for an electrical discharge machine illustrated in FIG. 9 is a power supply device for an electrical discharge machine that can generate current pulses of both polarities (positive polarity and reverse polarity) and additionally includes a DC power supply 1*b*, a switching element 4*c*, a diode 7*d*, and a resistor 5.

In FIG. 9, the DC power supply 1*b*, the switching element 4*c*, the diode 7*d*, and the resistor 5 are connected in series, one end of the resistor 5 is connected to the connection end of the inductance 6 and the diode 7*a*, and the other end of the resistor 5 is connected to the cathode end of the diode 7*d*. The source end of the switching element 4*c* is connected to the anode end of the diode 7*d* and the drain end of the switching element 4*c* is connected to the positive electrode of the DC power supply 1*b*. The negative electrode of the DC power supply 1*b* is connected to the connection end of the switching element 4*b* and the workpiece 3. Other configurations are the same as or equivalent to the above and the common components are given the same reference numerals except that the DC power supply 1 illustrated in FIG. 1 is illustrated as a DC power supply 1*a* in FIG. 9, and an overlapping explanation is omitted.

Figure 10:
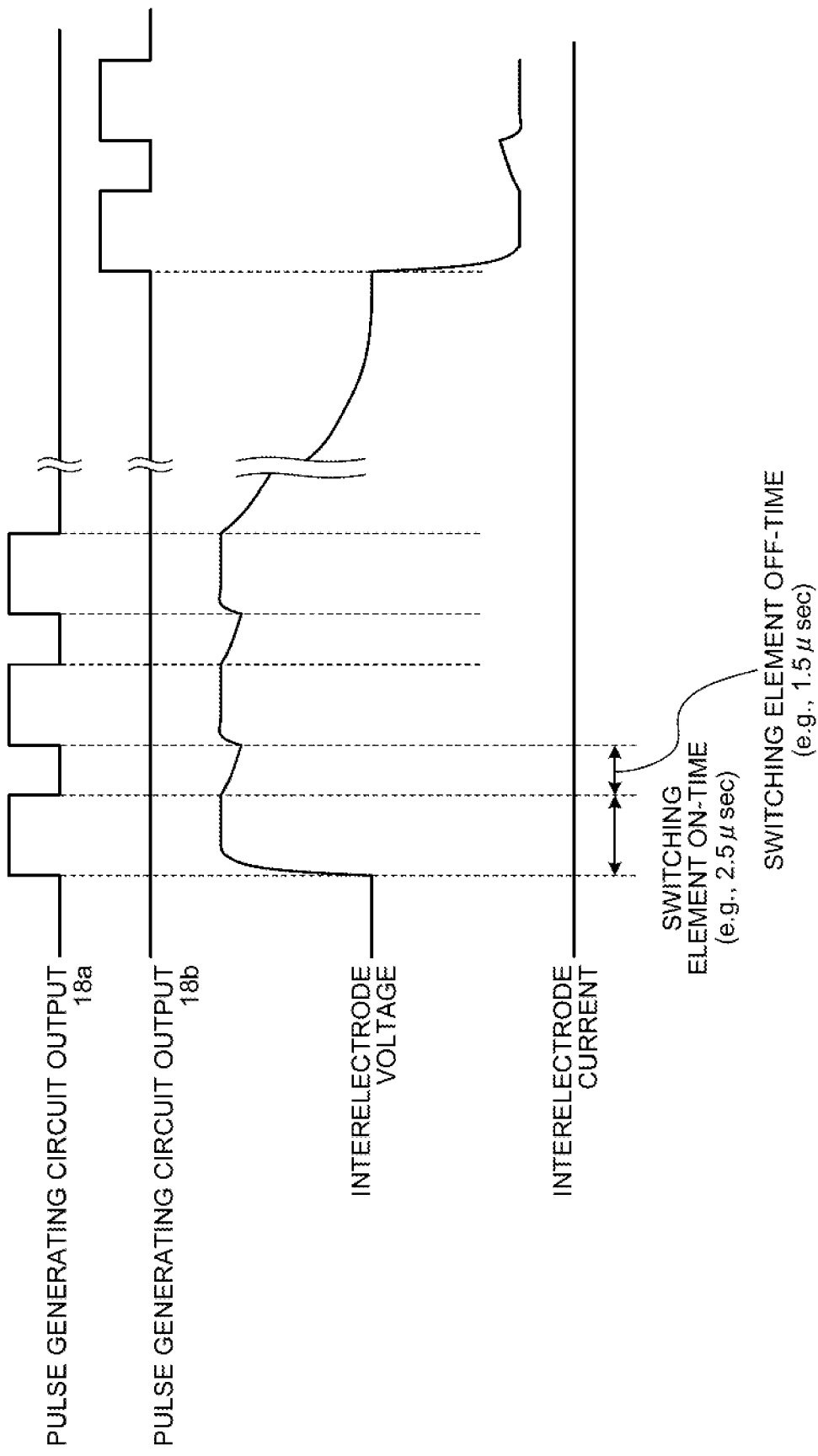
FIG. 10 is a diagram illustrating the interelectrode voltage and the interelectrode current when the electrodes are open in the electrical discharge machine according to the third embodiment.
Figure 11:
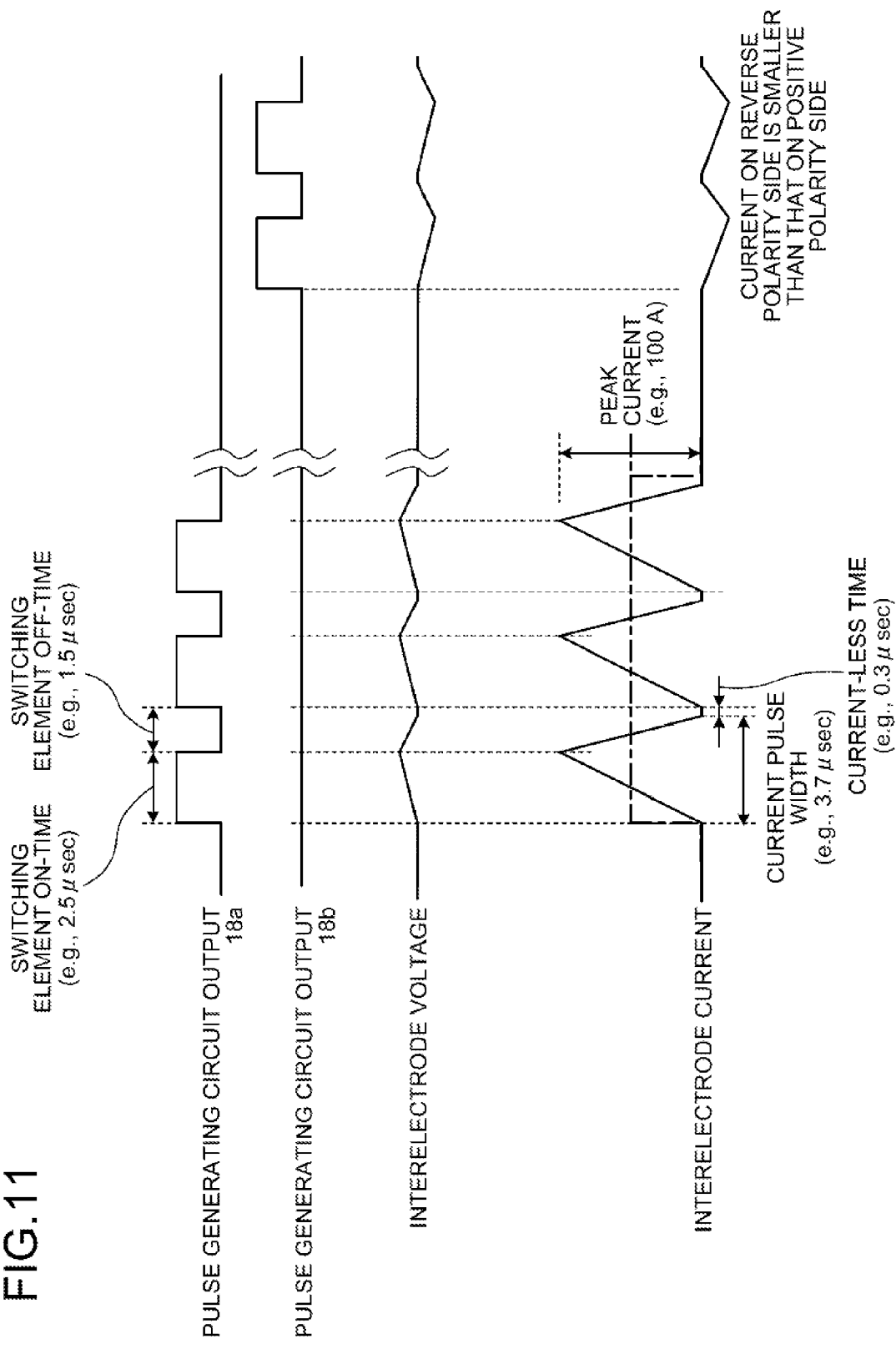
FIG. 11 is a diagram illustrating the interelectrode voltage and the interelectrode current when a discharge occurs in the electrical discharge machine according to the third embodiment.
Figure 12:
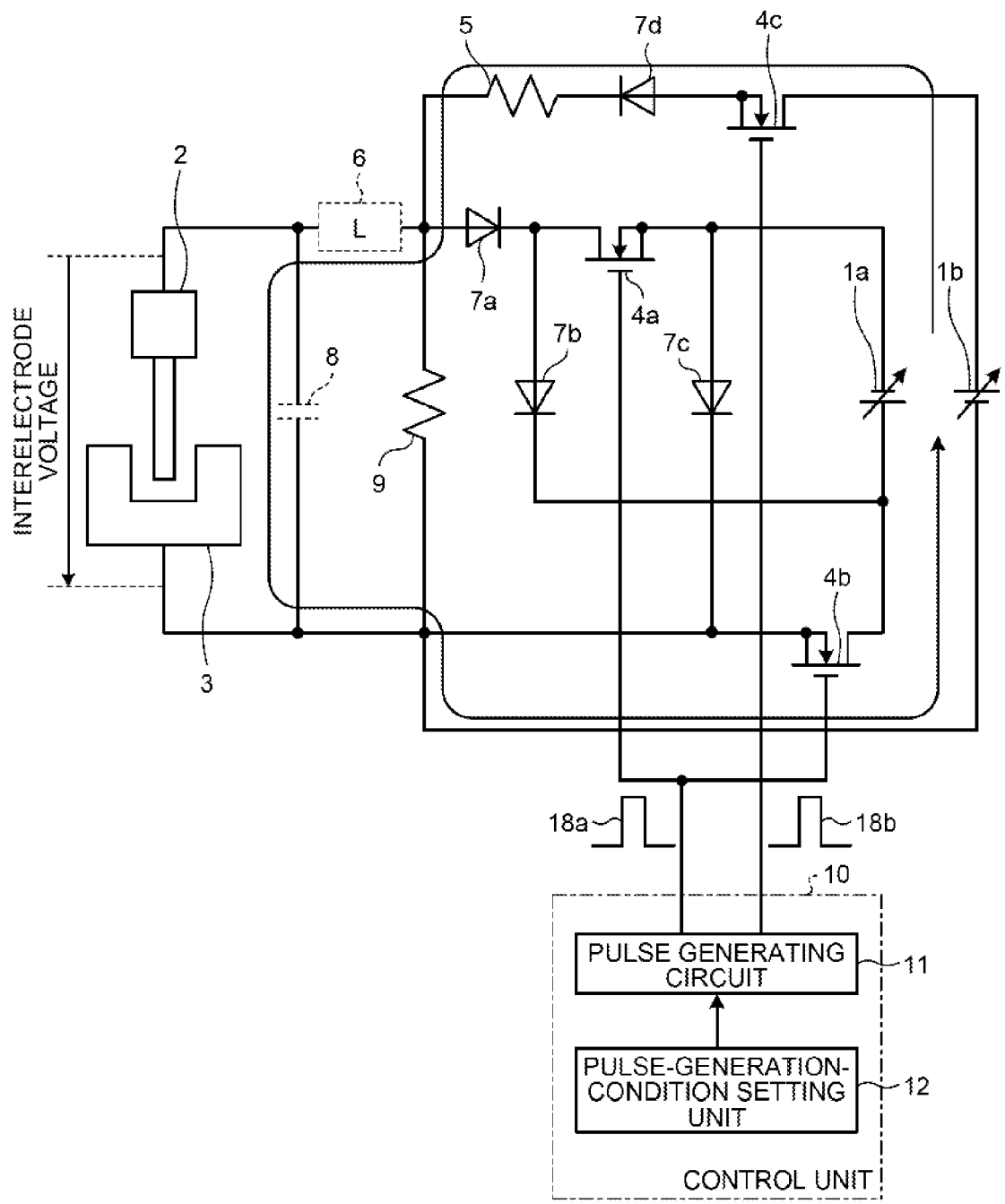
FIG. 12 is a diagram of a path of a reverse-polarity current that flows in the electrical discharge machine illustrated on the circuit configuration in FIG. 9.

Next, the operations of the power supply device for an electrical discharge machine according to the third embodiment will be explained with reference to each of drawings of FIG. 10 to FIG. 12. FIG. 10 is a diagram illustrating the interelectrode voltage and the interelectrode current when the electrodes are open, i.e., when the interelectrode current does not flow, FIG. 11 is a diagram illustrating the interelectrode voltage and the interelectrode current when a discharge occurs, i.e., when the interelectrode current flows, and FIG. 12 is a diagram illustrating a path of a reverse-polarity current flowing in the electrical discharge machine illustrated on the circuit configuration in FIG. 9. The operation when the positive-polarity pulse current flows is the same as or equivalent to that in the first embodiment; therefore, in the present embodiment, the operation when the reverse-polarity pulse current flows is explained.

In FIG. 10 and FIG. 11, while a pulse generating circuit output 18*a* is a positive-polarity pulse train (pulse group), a pulse generating circuit output 18*b* is a reverse-polarity pulse train (pulse group). The pulse groups of both polarities are used in order to prevent, for example, galvanic corrosion. When an oil-based machining fluid is used as a machining fluid, electrolytic action is scarcely affected. However, when pure water is used as a machining fluid or when an aqueous-based machining fluid mixed with a polymer compound is used as a machining fluid, galvanic corrosion occurs on the side of a workpiece and thus the processing surface may be damaged. As in the present embodiment, if machining is performed by using the pulse groups of both polarities (AC), such galvanic corrosion can be prevented.

Moreover, the path of the current that flows in the case of the reverse polarity is as illustrated in FIG. 12 and the inter-electrode current flows through the current path indicated by the solid line, i.e., from the positive electrode of the DC power supply 1*b*→the switching element 4*c*→the diode 7*d*→the resistor 5→the inductance 6→the machining electrode 2→the workpiece 3→the negative electrode of the DC power supply 1*b*. Although there is no resistor on the current path through which the positive-polarity current flows, the resistor 5 is present on the current path through which the reverse-polarity current flows. The resistor 5 functions as a current-limiting resistor to prevent a discharge on the reverse-polarity side that encourages consumption of the machining electrode. Due to the action of the resistor 5, the reverse-polarity side current is suppressed so as to be smaller than the positive-polarity side current, as illustrated in the waveform in the lower stage in FIG. 11.

Fourth Embodiment

Figure 13:
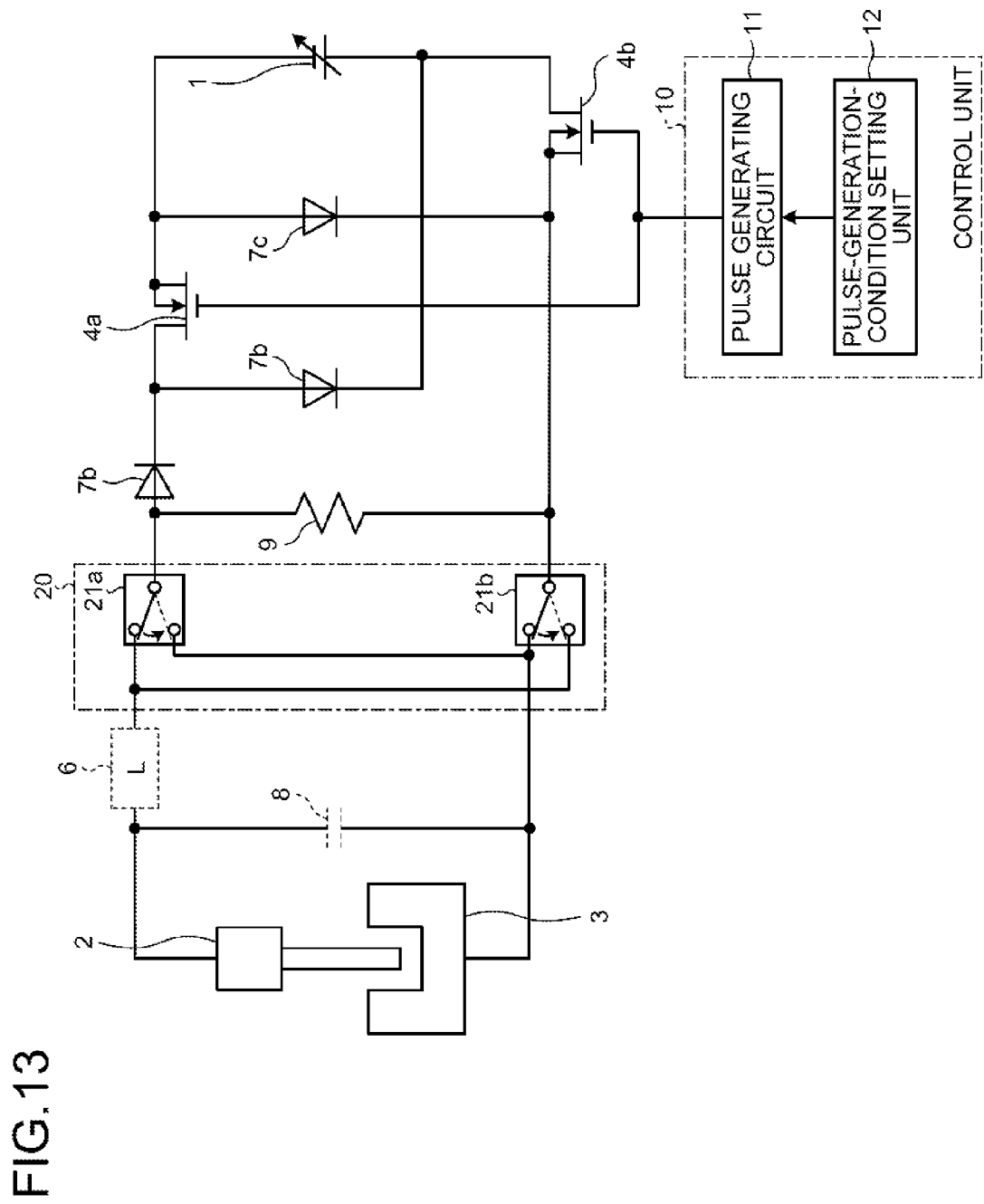
FIG. 13 is a diagram illustrating one configuration example of an electrical discharge machine that includes a power supply device for an electrical discharge machine according to a fourth embodiment.

FIG. 13 is a diagram illustrating one configuration example of an electrical discharge machine that includes a power supply device for an electrical discharge machine according to a fourth embodiment. While the power supply device for an electrical discharge machine according to the first embodiment illustrated in FIG. 1 to FIG. 4 is an example in which machining is performed by causing the machining current to flow by applying a voltage such that the machining electrode 2 has a negative polarity and the workpiece 3 has a positive polarity, in the present embodiment, machining can be performed in a state where the machining electrode 2 is switched to a positive polarity and the workpiece 3 is switched to a negative polarity by adding a polarity reversing circuit 20. This electrical discharge machine is used, for example, when the machining speed can be increased by performing machining with the polarity being reversed due to the material of the machining electrode 2 and the workpiece 3 or when the electrode is shaped by intentionally consuming a large amount of the electrode.

In FIG. 13, the polarity reversing circuit 20 includes one-circuit two-contact switches 21*a* and 21*b* and is inserted into the circuit to be connected on the machining electrode 2 side with respect to the resistor 9 and in parallel with the resistor 9. The switches 21*a* and 21*b* are both switched simultaneously. When the contacts are controlled such that they are on the solid-line side, the one-circuit two-contact switches 21*a* and 21*b* are connected such that the positive voltage of the DC power supply 1 is applied to the machining electrode 2 and the negative voltage of the DC power supply 1 is applied to the workpiece 3 and, when the contacts are controlled such that they are on the dashed-line side, the one-circuit two-contact switches 21a and 21b are connected such that the negative voltage of the DC power supply 1 is applied to the machining electrode 2 and the positive voltage of the DC power supply 1 is applied to the workpiece 3. The basic operation is similar to that in the first to third embodiments and therefore an explanation thereof is omitted.

Fifth Embodiment

In the fifth embodiment, an explanation will be given of the switching elements and the diodes included in the power supply devices for electrical discharge machines. The switching elements used in the power supply devices for electrical discharge machines are typically semiconductor switching elements (such as MOSFETs and IGBTs, hereinafter abbreviated as "Si-SW") made of silicon (Si). In a similar manner, the diodes used in the power supply devices for electrical discharge machines are typically semiconductor diodes (such as PN junction type and Schottky barrier type, hereinafter abbreviated to "Si-D") made of silicon. In the technology explained in the first embodiment, the typical Si-SW and Si-D can be used.

On the other hand, the technologies in the first and second embodiments are not limited to using the Si-SW and Si-D. Instead of silicon (Si), it is of course possible to use semiconductor switching elements made of silicon carbide (SiC), which has recently attracted attention, and semiconductor diodes made of SiC as the switching elements and the diodes in the power supply devices for electrical discharge machines described above.

Because SiC has characteristics such that it can be used at a high temperature, the allowable operating temperature of the switching elements and the diodes can be increased by using switching elements and diodes made of SiC as the switching elements and the diodes included in the power supply devices for electrical discharge machines. Thus, a problem with the amount of heat generated can be definitely avoided. Therefore, the upper limit of the peak current can be increased by using SiC elements and thus the machining ability can be enhanced.

Because SiC has characteristics that a high-speed operation is possible, the operation speed of the switching elements and the diodes can be increased by using switching elements and diodes made of SiC as the switching elements and the diodes included in the power supply devices for electrical discharge machines. Therefore, the current pulse width can be further reduced by using SiC elements and thus the machining accuracy and the surface roughness can be improved.

SiC is one example of a semiconductor referred to as a wide bandgap semiconductor due to its characteristic being that SiC has a larger bandgap than Si (in contrast, Si is referred to as a narrow bandgap semiconductor). In addition to SiC, for example, a semiconductor made of a gallium nitride-based material or diamond also belongs to wide bandgap semiconductors and the characteristics thereof have a lot of similarities to those of silicon carbide. Therefore, a configuration in which a wide bandgap semiconductor other than silicon carbide is used is also within the scope of the present invention.

A switching element and a diode made of such a wide bandgap semiconductor have a high voltage resistance and an allowable current density; therefore, the switching element and the diode can be reduced in size. With the use of the switching element and the diode that are reduced in size, the semiconductor module in which these elements are incorporated can be reduced in size.

Moreover, a switching element made of a wide bandgap semiconductor has a high heat resistance; therefore, in the case of a switching element that requires a cooling mechanism, such as a heatsink, the cooling mechanism can be reduced in size and thus the switching element module can be further reduced in size.

The configurations illustrated in the above first to fifth embodiments are examples of the configuration of the present invention and it is obvious that the configurations can be combined with other publicly known technologies and the configurations can be changed, for example, by omitting a part thereof without departing from the scope of the present invention.

INDUSTRIAL APPLICABILITY

As described above, the present invention is useful as a power supply device for an electrical discharge machine that can increase the machining speed and suppress an increase of the amount of heat generated compared with the conventional devices.

REFERENCE SIGNS LIST 1, 1a, 1b DC power supply
2 machining electrode
3 workpiece
4a, 4b, 4c switching element
5, 9 resistor
6 inductance
7a, 7b, 7c, 7d diode
8 stray capacitance
10 control unit
11 pulse generating circuit
12 pulse-generation-condition setting unit
18a pulse generating circuit output
18b pulse generating circuit output
20 polarity reversing circuit
21a, 21b switch

The invention claimed is:

1. A power supply device for an electric discharge machine comprising:
  a series circuit that includes a DC power supply and a switching element for supplying a DC or AC current pulse to a machining gap between a machining electrode and a workpiece; and
  a control unit that controls the switching element, wherein
  when generating a current pulse having a triangular shape by an inductance component present on the series circuit, the control unit controls on-time and off-time of the switching element such that a peak value of each current pulse in a pulse train including a plurality of current pulses gradually increases toward a maximum value of a peak value or gradually decreases from the maximum value of a peak value, and
  the control unit controls the switching element such that a current pulse time ratio, which is a ratio between a current-less time of the current pulse during which a current is supplied to the machining gap and a current duration of the current pulse during which a current is supplied to the machining gap, becomes between $1/5$ and $1/10$.

2. The power supply device for an electric discharge machine according to claim 1, wherein
  the series circuit includes a polarity reversing circuit that changes an application polarity of the DC power supply, and the control unit supplies a positive polarity pulse or a reverse polarity pulse to the machining gap by changing an application polarity of the DC power supply by controlling the polarity reversing circuit.

3. The power supply device for an electric discharge machine according to claim 1, wherein
the switching element comprises a first switching element and a second switching element,
the DC power supply includes a first DC power supply that is connected in positive polarity via the first switching element in the series circuit, and a second DC power supply that is connected in reverse polarity via the second switching element in the series circuit, and
the control unit controls the first switching element such that it is on when supplying a positive-polarity pulse to the machining gap and controls the second switching element such that it is on when supplying a reverse-polarity pulse to the machining gap.

4. The power supply device for an electric discharge machine according to claim 1, wherein the switching element included in the series circuit is a switching element made of a wide bandgap semiconductor.

5. The power supply device for an electric discharge machine according to claim 4, wherein the wide bandgap semiconductor is a semiconductor using silicon carbide, a gallium-nitride-based material, or diamond.

6. A power supply device for an electric discharge machine comprising:
a series circuit that includes a DC power supply and a switching element for supplying a DC or AC current pulse to a machining gap between a machining electrode and a workpiece; and
a control unit that controls the switching element, wherein
when generating a current pulse having a triangular shape by an inductance component present on the series circuit, the control unit controls on-time and off-time of the switching element such that a peak value of each current pulse in a pulse train including a plurality of current pulses gradually increases toward a maximum value of a peak value of gradually decreases from the maximum value of a peak value, and
the control unit controls the switching element such that a current pulse time ratio, which is a ratio between a current-less time of the current pulse during which a current is not supplied to the machining gap and a current duration of the current pulse during which a current is supplied to the machining gap, becomes equal to or less than $1/10$.

7. A power supply device for an electric discharge machine comprising:
a series circuit that includes a DC power supply and a switching element for supplying a DC or AC current pulse to a machining gap between a machining electrode and a workpiece; and
a control unit that controls the switching element, wherein
when generating a current pulse having a triangular shape by an inductance component present on the series circuit, the control unit controls on-time and off-time of the switching element such that a peak value of each current pulse in a pulse train including a plurality of current pulses gradually increases towards a maximum value of a peak value or gradually decreases from the maximum value of a peak value, and
the control unit controls the switching element such that a current pulse time ratio, which is a ratio between a current-less time of the current pulse during which a current is not supplied to the machining gap and a current duration of the current pulse during which a current is supplied to the machining gap, becomes about $1/5$.

* * * * *